United States Patent Office 3,748,327
Patented July 24, 1973

3,748,327
BASICALLY SUBSTITUTED 4(3H)-
QUINAZOLINONE DERIVATIVES
Rudi Beyerle, Bruchkobel, Germany, and Adolf Stachel, deceased, late of Frankfurt am Main-Fechenheim, Germany, by Ingeburg Lydia Katarina Stachel, heiress-at-law, Frankfurt am Main-Fechenheim, Germany, assignors to Cassella Farbwerke Mainkur Aktiengesellschaft, Frankfurt am Main-Fechenheim, Germany
No Drawing. Filed Apr. 22, 1971, Ser. No. 136,556
Claims priority, application Germany, Apr. 25, 1970,
P 20 20 234.0
Int. Cl. C07d 51/48
U.S. Cl. 260—243 B      3 Claims

ABSTRACT OF THE DISCLOSURE

The present invention relates to pharmaceutically active basically substituted 4(3H)-quinazolinone derivatives possessing anticonvulsant and sedative properties and useful as intermediates in the manufacture of coronary dilators and having the structural formula

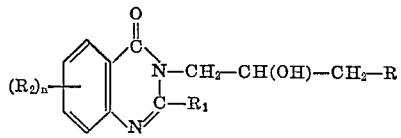

wherein R stands for a radical selected from the group consisting of secondary aliphatic, cycloaliphatic or araliphatic amines having 2-10 carbon atoms and 5-, 6- or 7-membered heterocyclic nitrogen bases which contain in addition to the nitrogen atom a corresponding number of methylene groups, as well as optionally an additional nitrogen atom, an O or an S atom, said radical being bound via a nitrogen atom; $R_1$ stands for hydrogen, an alkyl radical having from 1 to 4 carbon atoms, a pyridyl radical, a benzyl or a phenyl radical, the two latter being optionally substituted by lower alkyl, lower alkoxy groups or halogen; $R_2$ represents hydrogen, nitro, amino, trifluoromethyl or lower alkoxy groups having from 1 to 4 carbon atoms, and $n$ means an integer from 1 to 4; and to the production of such derivatives by (a) reacting a 4(3H)-quinazolinone having the formula

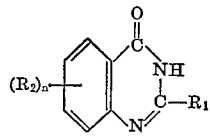

with a γ-halogeno-β-hydroxypropylamine having the formula

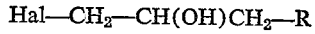

Hal—CH$_2$—CH(OH)CH$_2$—R or by (b) condensing a 4H-3,1-benzoxazine-4-one having the formula

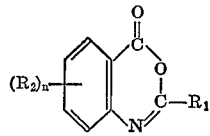

with a γ-amino-β-hydroxypropylamine having the formula

H$_2$N—CH$_2$—CH(OH)CH$_2$—R or by (c) condensing a 4(3H)-quinazolinone which is substituted in the 3-position by a γ-halogeno-β-hydroxypropyl radical and has the formula

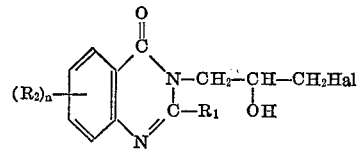

or the corresponding epoxy compound with a secondary amine having the general formula RH.

The present invention relates to new, pharmacologically valuable, basically substituted 4(3H)-quinazolinone derivatives of the general formula

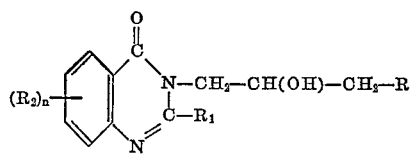

wherein R stands for a radical selected from the group consisting of secondary aliphatic, cycloaliphatic or araliphatic amines having 2 to 10 carbon atoms and 5, 6 or 7-membered heterocyclic nitrogen bases which contain in addition to the nitrogen atom a corresponding number of methylene groups, as well as optionally an additional nitrogen atom, an O or an S atom, said radical being bound via a nitrogen atom; $R_1$ stands for hydrogen, an alkyl radical having from 1 to 4 carbon atoms, a pyridyl radical, a benzyl or a phenyl radical, the two latter being optionally substituted by lower alkyl, lower alkoxy groups or halogen; $R_2$ represents hydrogen, nitro, amino, trifluoromethyl or lower alkoxy groups having from 1 to 4 carbon atoms, and $n$ means an integer from 1 to 4. The radical of a secondary amine $R_1$ which is bound via a nitrogen atom may derive in the aliphatic series from mono and diamines, such as dialkylamines, alkylalkenylamines, alkylenediamines, hydroxyalkylamines, alkoxyalkylamines and alkylcyanoalkylamines, alkylalkoxycarbonylalkylamines and bis-(alkoxycarbonylalkyl)-amines.

Such amines are for instance: dimethylamine, diethylamine, di-n-propylamine, allylmethylamine, N,N-diethyl-N′ - methylethylenediamine, N,N-diethyl-N′-methylpropylenediamine, N-methylethanolamine, N-methylpropanolamine, N-benzylethanolamine, N-methyl-γ-methoxypropylamine, N-methyl-γ-ethoxypropylamine, N-methyl-β - cyanoethylamine, N ′- methyl-β-ethoxycarbonylethylamine, bis-β-ethoxycarbonylethylamine.

Cycloaliphatic amines may be for instance: N-methylcyclopropylamine, N-methyl-cyclohexylamine.

Amines of the araliphatic series may be for instance: phenalkylalkylamines such as benzylmethylamine, phenethylmethylamine.

Heterocyclic nitrogen bases may be for instance: 5,6 and 7-membered heterocyclic nitrogen bases such as pyrrolidine, morpholine, thiomorpholine, piperidine, N-methylpiperazine, N-phenylpiperazine, N-(β-hydroxyethyl)-piperazine, N-(γ-hydroxypropyl)-piperazine, hexamethyleneimine, 2,5-dimethyl-piperazine.

Certain positions for the substitution by $R_2$ are preferred. In the case of a mono-substitution $R_2$ stands preferably in the 7-position, in the case of a di-substitution in the 6,7 or 7,8-position and in the case of a tri-substitution in the 5,6,7 or 6,7,8-position. The compounds obtainable under the present invention are pharmacologically useful as anticonvulsants and sedatives. Moreover, they are valuable intermediates for the production of compounds having an influence on the circulation. They may be converted, for instance, by way of esterification into pharmaceuticals having an effectiveness on the coronary vessels.

The basically substituted 4(3H)-quinazolinone derivatives of the present invention are obtained in different known per se methods.

They are, for instance, obtained by (a) reacting a 4(3H)-quinazolinone of the general formula

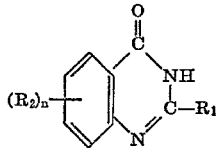

with a γ-halogeno-β-hydroxypropylamine of the general formula

Hal—CH₂—CH(OH)CH₂—R, or (b) by condensing a 4H-3,1-benzoxazine-4-one of the general formula

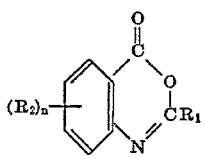

with a γ-amino-β-hydroxypropylamine of the general formula

H₂N—CH₂—CH(OH)CH₂—R, or (c) by condensing a 4(3H)-quinazolinone which is substituted in the 3-position by a γ-halogeno-β-hydroxypropyl radical and has the general formula

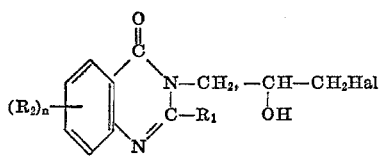

or the corresponding epoxy compound with a secondary amine of the general formula RH.

The substances used in the above processes as starting materials are obtained, as may be seen from the examples in the different known per se methods.

For a better understanding of the nature and the objects of this invention, reference should be made to the accompanying examples which are of an illustrative rather than a limiting nature. Unless otherwise stated, all temperatures given are in degrees centigrade.

Example 1

(a) 2-methyl - 6,7,8 - trimethoxy-4H-3,1-benzoxazine-4-one.—22.7. (0.1 mol) 3,4,5-trimethoxy anthranilic acid are dissolved in 200 cc. acetic anhydride and stirred during 15 hours under reflux. The reaction mixture is then concentrated in vacuo and the residue is stirred together with a 10% aqueous sodium bicarbonate solution. The water-insoluble reaction product is dissolved in ethyl acetate and washed several times with dilute aqueous sodium bicarbonate solution. The ethyl acetate phase is dried over potassium carbonate and evaporated to dryness in vacuo. Thus obtained is the 2-methyl-6,7,8-trimethoxy-4H-3,1-benzoxazine-4-one in the form of slightly yellowish needles having a melting point of 112°.

Yield: 22 g. (=87.6% of the theoretical).

Analogously the following products are obtained:

| | M.P. (deg.) |
|---|---|
| 2-ethyl-6,7,8-trimethoxy-4H-3,1-benzoxazine-4-one | 69 |
| 2-n-propyl - 6,7,8 - trimethoxy-4H-3,1-benzoxazine-4-one | 46 |
| 2-methyl - 5,6,7 - trimethoxy-4H-3,1-benzoxazine-4-one | 134 |
| 2 - methyl-5,6,7,8-tetramethoxy-4H-3,1-benzoxazine-4-one | (1) |
| 2-methyl-6,7-dimethoxy-4H-3,1-benzoxazine-4-one | 189 |
| 2-methyl-7-chloro-4H-3,1-benzoxazine-4-one | 149 |
| 2-methyl-6,8-dichloro-4H-3,1-benzoxazine-4-one | 144 |
| 2-methyl - 7 - trifluoromethyl-4H-3,1-benzoxazine-4-one | 76 |
| 2-methyl-7-nitro-4H-3,1-benzoxazine-4-one | 140 |

¹ Oily.

(b) 2-methyl-6,7,8-trimethoxy-4(3H)-quinazolinone.—25.1 g. (0.1 mol) 2-methyl-6,7,8-trimethoxy-4H-3,1-benzoxazine-4-one are introduced into 100 cc. concentrated aqueous ammonia solution and stirred during 20 hours at room temperature. The reaction product which separates in the form of crystals is sucked off and washed and water. After drying one obtains the 2-methyl-6,7,8-trimethoxy-4(3H)-quinazolinone in the form of colorless needles melting at 205°.

Yield: 23 g. (=92% of the theoretical).

Analogously the following intermediates are obtained.

| | M.P.(deg.) |
|---|---|
| 2-ethyl-6,7,8-trimethoxy-4(3H)-quinazolinone | 190 |
| 2 - n - propyl - 6,7,8 - trimethoxy - 4(3H)-quinazolinone | 169 |
| 2 - methyl - 56,7 - trimethoxy - 4(3H) - quinazolinone | 203–205 |
| 2 - methyl - 5,6,7,8 - tetramethoxy - 4(3H)-quinazolinone | 210–212 |
| 2-methyl-6,7-dimethoxy-4(3H)-quinazolinone | 304 |
| 2-methyl-7-chloro-4(3H)-quinazolinone | 207 |
| 2-methyl-6,8-dichloro-4(3H)-quinazolinone | 247 |
| 2 - methyl - 7 - trifluoromethyl - 4(3H) - quinazolinone | 196 |
| 2-methyl-7-nitro-4(3H)-quinazolinone | 224 |

A further method for the preparation of the 4(3H)-quinazolinones consists in acylating according to known methods, for instance in the presence of dilute aqueous alkali, the correspondingly substituted anthranilamides and in cyclizing the acylamine benzamides obtained which then yield the 4(3H)-quinazolinones.

(c) 2-benzoylamino-3,4,5-trimethoxy-benzamide.—22.6 g. (0.1 mol) 3,4,5-trimethoxy-anthranilamide are dissolved in 200 cc. anhydrous chloroform and admixed with 11 g. (0.11 mol) triethylamine. Subsequently, 15.4 g. (0.11 mol) benzoyl chloride are added while stirring at room temperature. The reaction mixture is stirred for 8 hours at room temperature and then evaporated in vacuo. The residue thus obtained is stirred together with dilute hydrochloric acid, sucked off and dried. For further purification the crude product is recrystallized from acetone.

Yield: 30 g. (=91% of the theoretical). M.P. 199–200°.

Analogously the following compounds are prepared:

| | M.P. (deg.) |
|---|---|
| 2 - (3,4,5 - trimethoxybenzoylamino) - 3,4,5 - trimethoxybenzamide | 207 |
| 2 - p - chloro - benzoylamino - 3,4,5 - trimethoxybenzamide | 220 |
| 2-benzoylamino-3,4,5-trimethoxybenzamide | 200 |
| 2-p toluylamino-3,4,5-trimethoxybenzamide | 184 |
| 2 - (2,3,4 - trimethoxy-phenylacetamino) - 3,4,5-trimethoxybenzamide | 185 |

(d) 2-phenyl-6,7,8-trimethoxy-4(3H)-quinazolinone.—37.9 g. (0.1 mol) 2-benzoylamino-3,4,5-trimethoxy-benzamide are introduced into a solution consisting of 4.4 g. (0.11 mol) sodium hydroxide in 200 cc. water. This suspension is heated to the boil and stirred until a limpid solution is obtained. After the addition of animal charcoal the reaction mixture is filtered so as to become limpid and the filtrate is adjusted to a pH value of 6 by the addition of acetic acid. The separated reaction product is sucked off, washed with water and dried. After recrystallizing from acetonitrile one obtains the 2-phenyl-6,7,8 - trimethoxy - 4(3H) - quinazolinone in the form of colorless crystals melting at 237–240°.

Yield: 27 g. (=81% of the theoretical).

Analogously, the following compounds are prepared:

| | M.P (deg.) |
|---|---|
| 2 - (3,4,5 - trimethoxyphenyl)-6,7,8-trimethoxy-4(3H)-quinazolinone | 236 |
| 2 - p - chlorophenyl - 6,7,8 - trimethoxy-4(3H)-quinazolinone | 280 |
| 2 - phenyl - 6,7,8 - trimethoxy - 4(3H) - quinazolinone | 175–177 |
| 2 - p - tolyl - 6,7,8 - trimethoxy - 4(3H) - quinazolinone | 254 |
| 2 - (2,3,4 - trimethoxybenzyl) - 6,7,8 - trimethoxy-4(3H)-quinazolinone | 190 |

(e) 2-methyl-3-(γ-morpholino-β-hydroxypropyl)-6,7,8-trimethoxy-4(3H)-quinazolinone.—25 g. (0.1 mol) 2-methyl-6,7,8-trimethoxy-4(3H)-quinazolinone are introduced into a solution consisting of 7 g. (0.1 mol) potassium ethylate in 80 cc. methanol. This reaction mixture is then evaporated to dryness in vacuo and the residue thus obtained is suspended in 200 cc. anhydrous toluene. A solution consisting of 19.8 g. (0.11 mol) γ-morpholino-β-hydroxypropyl chloride in 30 cc. dimethylformamide is then added dropwise and stirring is continued for 18 hours at 60–70°. The reaction mixture is then concentrated in vacuo and the residue is stirred together with water. The crude product which separates in the form of crystals is filtered off, dissolved in ethyl acetate and the ethyl acetate solution is washed several times with a 10% sodium hydroxide solution. The ethyl acetate solution is concentrated and obtained is the 2-methyl-3-(γ-morpholino - β - hydroxypropyl) - 6,7,8 - trimethoxy-4(3H)-quinazolinone in the form of colorless needles melting at 92–95°.

Yield: 32 g. (=84% of the theoretical).

Analogously the following 4(3H)-quinazolinones of the present invention may be prepared:

General formula:

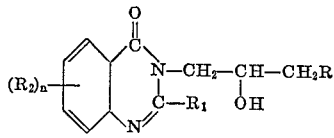

| $(R_2)_n$ | $R_1$ | R | Melting point, degrees (dihydrochloride) |
|---|---|---|---|
| H | $CH_3$ | $-N(C_2H_5)_2$ | [1] 76 |
| 7-$NO_2$ | $CH_3$ | $-N(C_2H_5)_2$ | [2] 88 |
| 7-$NH_2$ | $CH_3$ | $-N(C_2H_5)_2$ | [2] 147 |
| 7-Cl | $CH_3$ | $-N(C_2H_5)_2$ | [2] 130 |
| 7-$CF_3$ | $CH_3$ | $-N(C_2H_5)_2$ | [2] 113 |
| 6,8-$Cl_2$ | $CH_3$ | $-N(C_2H_5)_2$ | [2] 90 |
| 6,7-$(OCH_3)_2$ | $CH_3$ | $-N(C_2H_5)_2$ | [2] 110–111 |
| 5,6,7-$(OCH_3)_3$ | $CH_3$ | $-N(C_2H_5)_2$ | [2] 123 |
| 5,6,7-$(OCH_3)_3$ | $CH_3$ | $-N\diagup\diagdown O$ (morpholino) | [2] 142 |
| 6,7,8-$(OCH_3)_3$ | H | Same as above. | [1] 115 |
| 6,7,8-$(OCH_3)_3$ | H | $-N\diagup\diagdown$ (piperidino) | [1] 72 |
| 6,7,8-$(OCH_3)_3$ | $CH_3$ | $-N(n-C_3H_7)_2$ | [2] 89–91 |
| 6,7,8-$(OCH_3)_3$ | $CH_3$ | $-N(CH_3)C_2H_5$ | [1] 142 |
| 6,7,8-$(OCH_3)_3$ | $CH_3$ | $-N(CH_3)C_4H_9$ | [1] 95 |
| 6,7,8-$(OCH_3)_3$ | $CH_3$ | $-N(CH_3)CH_2-CH=CH_2$ | [1] 97 |
| 6,7,8-$(OCH_3)_3$ | $CH_3$ | $-N(CH_3)-CH_2CH_2OH$ | [2] 60 |
| 6,7,8-$(OCH_3)_3$ | $CH_3$ | $-N(CH_3)CH_2CH_2N(C_2H_5)_2$ | [1,3] 65 |
| 6,7,8-$(OCH_3)_3$ | $CH_3$ | $-N(CH_3)CH_2CH_2CH_2OC_2H_5$ | Oily |
| 6,7,8-$(OCH_3)_3$ | $CH_3$ | $-N(CH_3)-\triangleleft$ (cyclopropyl) | [1] 80 |
| 6,7,8-$(OCH_3)_3$ | $CH_3$ | $-N(CH_3)-\langle H \rangle$ (cyclohexyl) | 130 |
| 6,7,8-$(OCH_3)_3$ | $CH_3$ | $-N(CH_3)CH_2-C_6H_5$ | 117 |
| 6,7,8-$(OCH_3)_3$ | $CH_3$ | $-N\diagup\diagdown$ (pyrrolidino) | [1] 70 |
| 6,7,8-$(OCH_3)_3$ | $CH_3$ | $-N\diagup\diagdown$ (piperidino) | [2] 108 |
| 6,7,8-$(OCH_3)_3$ | $CH_3$ | $-N\diagup\diagdown O$ (morpholino) | [2] 104 |
| 6,7,8-$(OCH_3)_3$ | $CH_3$ | $-N\diagup\diagdown N-CH_3$ | [3] 153 |
| 6,7,8-$(OCH_3)_3$ | $CH_3$ | $-N\diagup\diagdown S$ | [2] 118 |
| 6,7,8-$(OCH_3)_3$ | $CH_3$ | $-N\diagup\diagdown N-CH_2CH_2OH$ | [3] 197 |

See footnotes at end of table.

TABLE—Continued

| (R₂)ₙ | R₁ | R | Melting point, degrees (dihydrochloride) |
|---|---|---|---|
| 6,7,8-(OCH₃)₃ | C₂H₅ | —N(C₂H₅)₂ | Oily |
| 6,7,8-(OCH₃)₃ | C₂H₅ | —N(CH₃)—CH₂CH₂CH₂OCH₃ | 120 |
| 6,7,8-(OCH₃)₃ | C₂H₅ | —N(CH₃)—CH₂—CH=CH₂ | 123 |
| 6,7,8-(OCH₃)₃ | C₂H₅ | —N(CH₃)—⟨H⟩ | 127 |
| 6,7,8-(OCH₃)₃ | C₂H₅ | —N⟨O⟩ | Oily |
| 6,7,8-(OCH₃)₃ | C₂H₅ | —N⟨ ⟩ | ² 130 |
| 6,7,8-(OCH₃)₃ | C₂H₅ | —N⟨ ⟩ | ² 129 |
| 6,7,8-(OCH₃)₃ | n-C₃H₇ | Same as above | ² 136 |
| 6,7,8-(OCH₃)₃ | n-C₃H₇ | —N⟨O⟩ | ² 140 |
| 6,7,8-(OCH₃)₃ | C₆H₅ | —N(C₂H₅)₂ | ² 99 |
| 6,7,8-(OCH₃)₃ | C₆H₄(4-Cl) | —N(C₂H₅)₂ | ² 117 |
| 6,7,8-(OCH₃)₃ | C₆H₂(3,4,5-(OCH₃)₃) | —N(C₂H₅)₂ | ² 88 |
| 6,7,8-(OCH₃)₃ | C₆H₄(4-CH₃) | —N(C₂H₅)₂ | ¹ ⁴ 90 |
| 6,7,8-(OCH₃)₃ | —CH₂—C₆H₂(2,3,4-(OCH₃)₃) | —N⟨O⟩ | ² 90 |
| 6,7,8-(OCH₃)₃ | (pyridyl) | —N(C₂H₅)₂ | ² 96 |
| 6,7,8-(OCH₃)₃ | CH₃ | —N(CH₃)CH₂CH₂COOC₂H₅ | Oily |
| 6,7,8-(OCH₃)₃ | CH₃ | —N(CH₃)CH₂CH₂CN | ¹ 80 |
| 6,7,8-(OCH₃)₃ | CH₃ | —N(CH₂CH₂COOC₂H₅)₂ | ¹ 50 |
| 5,6,7,8-(OCH₃)₄ | CH₃ | —N(C₂H₅)₂ | ² 97 |

¹ Decomposition.   ² Base.   ³ Trihydrochloride.   ⁴ Dihydrochloride.

Example 2

2 - methyl - 3 - (γ-diethylamino-β-hydroxypropyl)-6,7,8 - trimethoxy - 4(3H) - quinazolinone.—25.1 g. (0.1 mol) 2 - methyl - 6,7,8 - trimethoxy - 4H - 3,1-benzoxazine - 4 - one and 44 g. (0.3 mol) γ-diethylamino-β-hydroxypropylamine are stirred during 6 hours at 140° in a nitrogen atmosphere. The excessive γ-diethylamino-β-hydroxypropylamine is distilled off in vacuo and the residue is dissolved in 200 cc. boiling water. After having been allowed to cool down for awhile the reaction product separates from the aqueous solution in the form of crystals. The crude product is sucked off, washed with water and dried. For purification purposes it is then recrystallized from benzene. Thus obtained is the 2-methyl - 3 - (γ-diethylamino-β-hydroxypropyl)-6,7,8-trimethoxy - 4(3H)-quinazolinone in the form of colorless crystals melting at 83°.

Yield: 17 g. (=45% of the theoretical).

Example 3

(a) 2 - methyl - 3 - (2',3' - epoxypropyl) - 6,7,8-trimethoxy - 4(3H)-quinazolinone.—25 g. (0.1 mol) 2-methyl - 6,7,8 - trimethoxy - 4(3H) - quinazolinone are dissolved in a solution consisting of 7 g. (0.1 mol) potassium ethylate in 70 cc. methanol and evaporated to dryness in vacuo. The reidue is suspended in 170 cc. dimethylsulfoxide. 94.5 g. (1 mol) epichlorohydrin are added while stirring at room temperature. Subsequently, the reaction mixture is stirred for 20 hours at room temperature and 800 cc .aqueous potassium carbonate solution are added. The reaction mixture is shaken out several times with ethyl acetate, the combined ethyl acetate extracts are dried over potassium and concentrated in vacuo. The residue is stirred together with anhydrous ether and thus obtained is the 2 - methyl - 3 - (2',3'-epoxypropyl)- 6,7,8-trimethoxy - 4(3H) - quinazolinone in the form of colorless needles melting at 124–127°.

Yield 20 g. (=65.4% of the theoretical).

(b) 2 - methyl - 3 - (γ-piperidino-β-hydroxypropyl)-6,7,8 - trimethoxy - 4(3H) - quinazolinone.—30.6 g. (0.1 mol) 2 - methyl - 3 - (2',3' - epoxypropyl) - 6,7,8,-trimethoxy - 4(3H) - quinazolinone and 25.5 g. (0.3 mole) piperidine are dissolved in 150 cc. alcohol and heated during 12 hours under reflux. The reaction mixture is then evaporated to dryness in vacuo and the residue is recrystallized from benzene with the addition of animal charcoal. Thus obtained is the 2-methyl-3-(γ-piperidino-β-hydroxypropyl) - 6,7,8 - trimethoxy - 4(3H)-quinazolinone in the form of colorless needles melting at 108°.

Yield: 26 g. (=66.5% of the theoretical).

What is claimed is:

1. Basically substituted derivatives of 4(3H)-quinazolinone having the structural formula

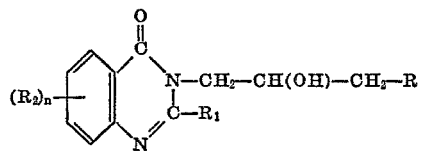

wherein R stands for a radical selected from the group consisting of —N(C₂H₅)₂, —N(n-C₃H₇)₂, —N(CH₃)C₂H₅, —N(CH₃)C₄H₉,
—N(CH₃)CH₂—CH=CH₂, —N(CH₃)—CH₂CH₂OH,
—N(CH₃)CH₂CH₂N(C₂H₅)₂,
—N(CH₃)CH₂CH₂CH₂OC₂H₅,
—N(CH₃)CH₂CH₂CH₂OCH₃,
—N(CH₃)CH₂CH₂COOC₂H₅,

—N(CH₃)CH₂CH₂CN, —N(CH₂CH₂COOC₂H₅)₂, —N(CH₃)—CH₂—C₆H₅,

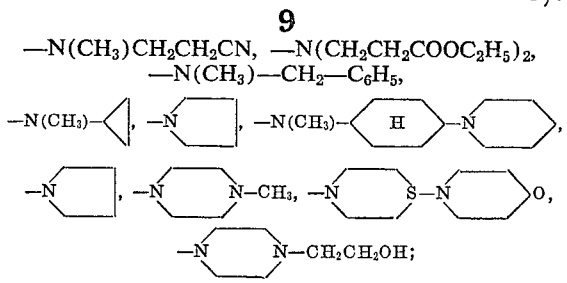

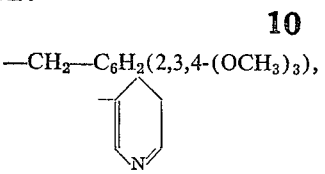

—CH₂—C₆H₂(2,3,4-(OCH₃)₃), $R_1$ stands for hydrogen, an alkyl radical having from 1 to 4 carbon atoms, a pyridyl radical, a benzyl or a phenyl radical, said benzyl and phenyl radicals being optionally substituted by alkyl and alkoxy groups having 1–4 carbon atoms or halogen; $R_2$ stands for hydrogen, nitro, amino, trifluoromethyl and alkoxy radicals having 1–4 carbon atoms; and $n$ stands for an integer from 1 to 4.

2. Basically substituted derivatives of 4(3H)-quinazolinone according to claim 1, wherein $R_1$ is selected from the group consisting of H, —CH₃, —C₂H₅, n-C₃H₇, —C₆H₅, —C₆H₄(4-Cl), —C₆H₂(3,4,5-(OCH₃)₃),

—C₆H₄(4-CH₃),

3. Basically substituted derivatives of 4(3H)-quinazolinone according to claim 1, wherein $(R_2)_n$ is selected from the group consisting of H, 7-NO₂, 7-NH₂, 7-Cl, 7-CF₃, 6,8-Cl₂, 6,7-(OCH₃)₂, 5,6,7-(OCH₃)₃, 6,7,8-(OCH₃)₃, 5,6,7,8-(OCH₃)₄.

References Cited
UNITED STATES PATENTS
3,231,572  1/1966  Hayao _____ 260—256.4 Q RICHARD J. GALLAGHER, Primary Examiner U.S. Cl. X.R.
260—244 R, 247.2 A, 251 QA, 256.4 Q, 999